United States Patent [19]
Anderson et al.

[11] Patent Number: 5,936,514
[45] Date of Patent: Aug. 10, 1999

[54] POWER SUPPLY INPUT CIRCUIT FOR FIELD INSTRUMENT

[75] Inventors: Stephen D. Anderson, Edina; Theodore L. Johnson, St. Louis Park; Brian S. Junk, Savage; Michael A. Orman, Apple Valley; Theodore H. Schnaare, Chaska; David E. Tetzlaff, Minnetonka, all of Minn.

[73] Assignee: Rosemount Inc., Eden Prairie, Minn.

[21] Appl. No.: 08/720,120

[22] Filed: Sep. 27, 1996

[51] Int. Cl.$^6$ .................................................. H04M 11/04
[52] U.S. Cl. .............................. 340/310.01; 340/310.03; 340/310.06
[58] Field of Search ................... 340/310.01, 310.02, 340/310.03, 310.04, 310.05, 310.06, 310.07, 310.08

[56] References Cited

U.S. PATENT DOCUMENTS

| | | | |
|---|---|---|---|
| 3,434,034 | 3/1969 | Garber et al. | 321/43 |
| 3,665,221 | 5/1972 | Wickliff | 307/255 |
| 3,700,999 | 10/1972 | Gourse | 320/216 |
| 3,959,772 | 5/1976 | Wakasa et al. | 340/310.01 |
| 3,976,932 | 8/1976 | Collins | 321/45 R |
| 4,149,880 | 4/1979 | Ulmer et al. | 361/246 |
| 4,252,997 | 2/1981 | Lodas et al. | 179/5 R |
| 4,501,933 | 2/1985 | Siligoni et al. | 179/81 R |
| 4,507,525 | 3/1985 | Siligoni et al. | 179/81 R |
| 4,535,203 | 8/1985 | Jenkins et al. | 179/81 R |
| 5,122,794 | 6/1992 | Warrior | 340/825.2 |
| 5,166,678 | 11/1992 | Warrior | 340/870.15 |
| 5,179,488 | 1/1993 | Rovner | 361/18 |
| 5,420,578 | 5/1995 | O'Brien et al. | 340/870.13 |
| 5,434,774 | 7/1995 | Seberger | 364/172 |
| 5,481,200 | 1/1996 | Voegele et al. | 324/718 |
| 5,563,587 | 10/1996 | Harjani | 340/870.3 |
| 5,754,596 | 5/1998 | Bischoff et al. | 375/295 |

FOREIGN PATENT DOCUMENTS

| | | |
|---|---|---|
| 0 023 683 | 2/1981 | European Pat. Off. . |
| 2 731 851 | 9/1996 | France . |
| WO 88/01417 | 2/1988 | WIPO . |
| WO 96/19261 | 6/1996 | WIPO . |

*Primary Examiner*—Nina Tong
*Attorney, Agent, or Firm*—Westman, Champlin & Kelly, P.A.

[57] ABSTRACT

A field instrument includes an input circuit having a transistor bridge rectifier which is couplable to a power supply. The transistor bridge rectifier is configured to provide power from the power supply to a remainder of the field instrument.

25 Claims, 6 Drawing Sheets

POWER SUPPLY INPUT CIRCUIT FOR FIELD INSTRUMENT

BACKGROUND OF THE INVENTION

The present invention relates to a field instrument. More specifically, the present invention relates to an input circuit in the field instrument which receives power from a communication loop.

Process control systems are used in manufacturing and other process control environments to monitor and control the operation of processes. In a conventional process control system, instruments are placed in the field to implement the process control. Such instruments (which are typically referred to as field instruments or transmitters) may typically include a peripheral device, and circuitry to support the peripheral device. The field instrument is coupled to a communication loop (i.e., a network segment of the process control system) and transmits information over the communication loop to other portions of the process control system. The communication loop is typically a two-wire loop which provides power for operation of the field instrument. Communication is accomplished over the loop through a field bus standard which is a digital communications protocol.

The field instruments may typically include a transmitter, a process variable control circuit or a field mounted controller. A transmitter includes a sensor which is placed in the field and monitors a variable of the process, such as pressure, temperature or flow. The transmitter is coupled to the communication loop and transmits information over the communication loop to a controller which monitors operation of the process. Transmitter communication using the field bus standard allows more than one transmitter to be coupled to a single communication loop to transmit the sensed process variable to the control room. The field bus standard describing this communication is described in ISA 50.02-1992 Section 11. The HART® standard is another communication standard which allows digital communication over a 4–20 mA process variable signal.

If the field instrument includes a process variable control circuit, the peripheral is typically a valve or other controllable device for controlling some aspect of the process. The position of the valve, along with other desired parameters, are monitored and the valve is controlled by the process variable control circuit to a desired position. Conventional process variable control circuits include a microprocessor, a microcontroller, or other suitable controller which performs calculations and signal correction, and which also facilitates communication over the communication If the field instrument is a field mounted controller, it does not include a peripheral device per se. Instead, it is coupled to the communication loop and may typically poll a plurality of transmitters to receive a signal indicative of a sensed parameter or parameters. The field mounted controller then performs a desired calculation and provides a resultant signal over the communication loop for use in other portions of the process control system.

In any case, the field instrument is powered by the communication loop either by an AC current, or by a DC voltage. When an AC current is applied, an input circuit in the field instrument rectifies the AC signal so that it can be provided to the remainder of the circuitry in the field instrument. When a DC voltage is applied, it is desirable that the field instrument be configured so that the DC voltage supply can be connected to the field instrument in either polarity (i.e., the field instrument will operate regardless of the particular orientation taken by the positive and negative power supply terminals relative to the field instrument).

Prior field instruments have included a diode bridge rectifier circuit. However, such a circuit introduces a voltage drop thereacross of approximately 0.6 volts to 1.4 volts. Therefore, the voltage available to the rest of the field instrument is significantly less than that provided by the terminals of the power supply. This reduces both the power efficiency and the maximum output voltage of the bridge rectifier.

SUMMARY OF THE INVENTION

A field instrument includes an input circuit which is configured with a transistor bridge rectifier couplable to a power supply. The transistor bridge rectifier is configured to provide power from the power supply to a remainder of the field instrument.

In one preferred embodiment, the field instrument includes a peripheral which is a controllable device for controlling a process variable. Such a device may typically be a valve. A peripheral accessing circuit includes a process variable control circuit for controlling the valve.

In another embodiment, the peripheral includes a sensor for sensing a process variable. The peripheral accessing circuit includes a transmitter for receiving a sensor signal provided by the sensor and transmitting it to a control apparatus which receives the sensor signal and controls a process based on the sensor signal received.

In yet another embodiment, the field instrument includes a field mounted controller. The controller is coupled for communication over a communication loop.

DETAILED DESCRIPTION OF THE PREFERRED EMBODIMENTS

Figure 1:
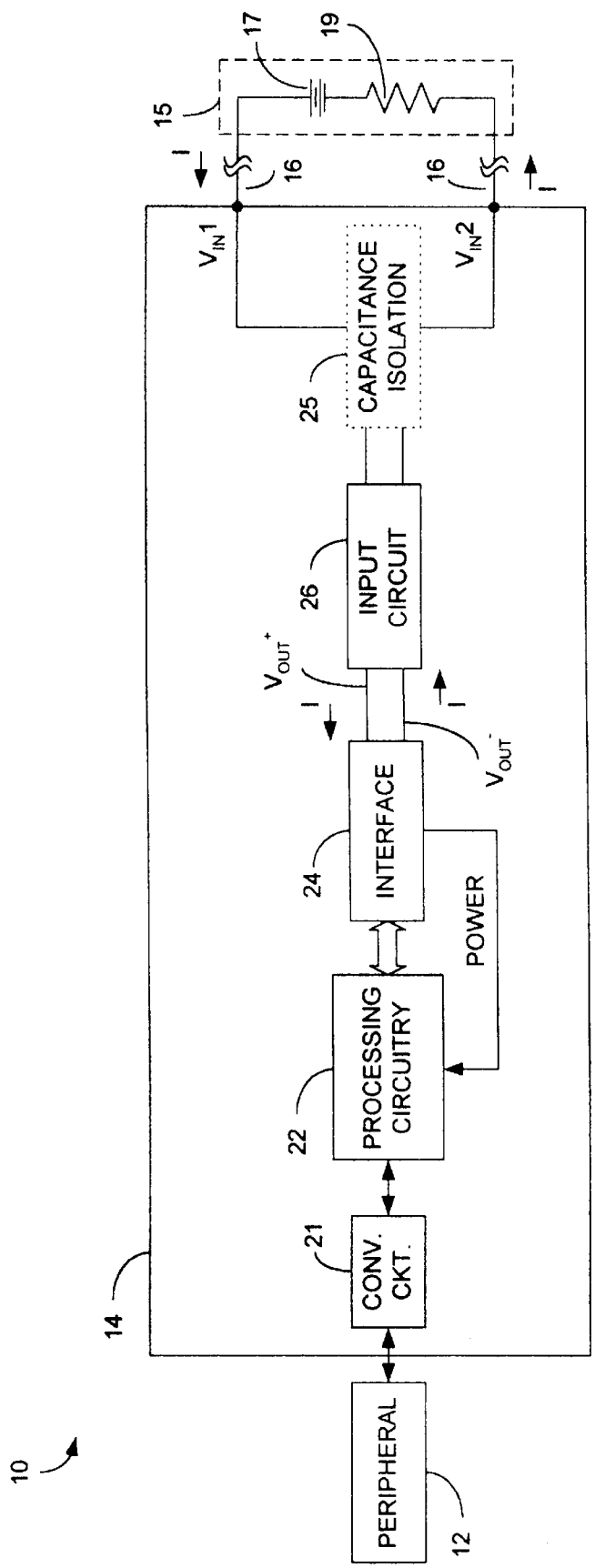
FIG. 1 is a simplified block diagram of a field instrument in accordance with the present invention coupled to a communication loop.

FIG. 1 is a simplified block diagram of a field instrument 10 according to the present invention. Field instrument 10 can be configured as a transmitter, a process variable controller, or a field mounted controller. In the embodiments in which field instrument 10 is configured as a transmitter or a process variable controller, field instrument 10 includes peripheral 12 and peripheral accessing circuit 14. Peripheral accessing circuit 14 is coupled to communication loop 16. In the embodiment in which field instrument 10 is configured as a field mounted controller, it may not have peripheral 12 (or converter circuit 21 described below).

Communication loop 16 is optionally a 4–20 mA loop which is coupled to control room or power supply 15. Control room 15 can be modeled as a voltage supply 17 in series with a resistor 19, in a known manner.

Field instrument 10 is wholly powered by communication loop 16 and can be operated either in a current mode or in a voltage mode. In the current mode, the power supplied to field instrument 10 is realized by applying a current through communication loop 16 to the input terminals of field instrument 10. In one preferred embodiment, the power supply is based on an AC current at approximately 16 kHz. A communication signal is superimposed over the AC current at a frequency of approximately 1 MHz.

In the voltage mode, the power supplied to field instrument 10 is realized by placing a symmetric voltage via communication loop 16 across the input terminals of field instrument 10. In the voltage mode, the wires coupled to the terminals of field instrument 10 also carry the digital communication signal. In one preferred embodiment, each field instrument 10 is considered to be a current sink pulling approximately 10 mA of current from loop 16. The communication signals are superimposed on the 10 mA supply current signal with a peak level of approximately 9 mA.

If field instrument 10 is configured as a transmitter or a process variable control circuit, field instrument 10 includes peripheral 12, converter circuit 21, processing circuitry 22, interface circuit 24, supply input circuit 26 and optional capacitance isolation circuit 25. If field instrument 10 is configured as a transmitter, peripheral 12 is a sensor which senses a process variable which is related to a parameter of the process, such as temperature, pressure or flow. Peripheral 12 provides a sensor signal indicative of the process variable to converter 21 which converts the signal into digital form and provides it to processing circuitry 22 which processes the process variable. Processing circuitry 22 may correct for errors in (or compensate) the sensor or perform other calculations on the process variable and is realized in the form of a microprocessor. The processing circuitry 22 is coupled to interface circuitry 24 and controls interface circuitry 24 to transmit a signal indicative of the corrected process variable over communication loop 16 via input circuit 26 and optional capacitance isolation circuit 25.

In the embodiment in which field instrument 10 includes a process variable control circuit, peripheral 12 typically includes a controllable device, such as a valve or a switch, for controlling some parameter of the process under control. Processing circuitry 22, in this embodiment, typically includes a microprocessor, a microcontroller, or other suitable control circuit for receiving commands over communication loop 16, via interface 24, and for controlling peripheral 12 based on the commands received. In this embodiment, converter circuit 21 is a digital-to-analog converter, or other suitable converter, which converts the digital control signal from circuit 22 to an analog signal (or maintains it as a digital signal, as appropriate) which is applied to the valve comprising peripheral device 12. In this embodiment, field instrument 10 can also include a current-to-pressure controller. Processing circuitry 22 receives a control current over communication loop 16, via interface 24, and converts the control current to a pressure such as by controlling a valve. Processing circuitry 22, in such an embodiment, would also receive feedback from peripheral device 12 in accomplishing such control.

In the embodiment in which field instrument 10 is a field mounted controller, it may not have an associated peripheral device 12 or converter circuit 21. Rather, the controller polls one or more transmitters and receives signals indicative of the sensed parameters over communication loop 16. Processing circuitry 22 performs desired calculations based on the signals received and provides a resultant output signal over loop 16 to be used in other portions of the process control environment.

Capacitance isolation circuit 25 is optional and is described in greater detail in U.S. patent application Ser. No. 08/225,237 filed on Jun. 7, 1994, assigned to the same assignee as the present application and entitled TRANSMITTER WITH ELECTRICAL CIRCUITRY FOR INHIBITING DISCHARGE OF STORED ENERGY, which is incorporated herein by reference. Briefly, capacitance isolation circuit 25 includes an isolation network coupled between the remainder of the circuitry in field instrument 10 and communication loop 16. The isolation network works to prevent discharge of energy stored in the effective capacitance of field instrument 10 onto the communication loop 16.

Supply input circuit 26 performs a number of functions. If field instrument 10 is operated in the current mode (in which the power signal supplied to field instrument 10 is in the form of an AC current), then supply input circuit 26 rectifies the AC current so that it is usable to supply power to the remainder of field instrument 10. If field instrument 10 is operated in the voltage mode (in which the power signal supplied to field instrument 10 is in the form of a DC voltage) input circuit 26 is configured to allow the DC input supply to be connected to field instrument 10 in either polarity. Thus, it is not important that the operator installing the system connect the supply in any particular polarity.

Figure 2:
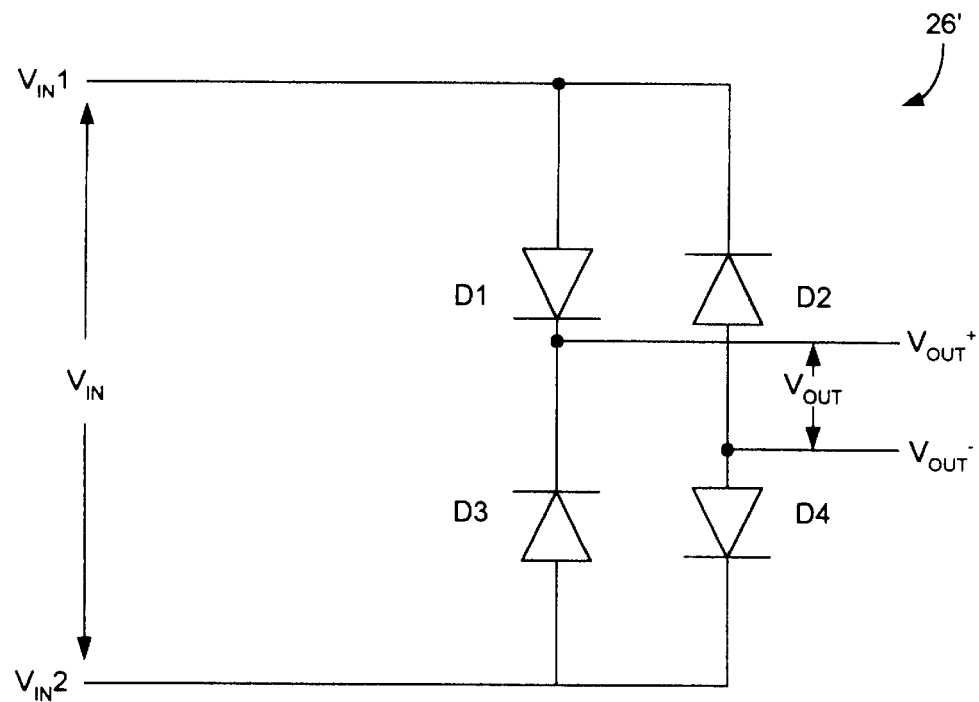
FIG. 2 shows an input circuit in accordance with the prior art.

FIG. 2 is a schematic diagram of supply input circuit 26' according to the prior art. Circuit 26' includes diodes D1, D2, D3 and D4 which are connected in a diode bridge rectifier configuration. Circuit 26' has disadvantages which are clearly illustrated when it is assumed that the field instrument containing circuit 26' is operated in the voltage mode. In that case, a DC voltage is applied across the terminals of communication loop 16 so that each of the two terminals are at a different voltage potential (either $V_{IN1}$ or $V_{IN2}$). Depending on the polarity of the supply (i.e., depending on which terminal of communication loop 16 the operator has connected to which terminal of field instrument 10) either $V_{IN1}$ or $V_{IN2}$ will have a higher voltage potential. The present discussion will proceed under the assumption that $V_{IN}1$ is higher than $V_{IN}2$.

In that case, diodes D1 and D4 are forward biased and diodes D2 and D3 are reverse biased, and nonconducting. It can be seen that diodes D1 and D4 each reduce the output voltage $V_{out}$ by an amount $V_D$ corresponding to the voltage drop across the forward biased diodes. The voltage drop $V_D$ for a typical diode is approximately 0.7 volts. Schottky diodes have a typical $V_D$ of approximately 0.3 volts, but they are significantly more expensive than conventional diodes. Therefore, circuit 26' introduces a voltage drop ($V_{IN}-V_{OUT}$) of two times the forward diode voltage $V_D$ of diodes D1–D4. This is approximately 0.6 volts to 1.4 volts.

Since the output voltage $V_{OUT}$ is a voltage which is supplied to the remainder of field instrument 10, supply input circuit 26' introduces a significant voltage drop which reduces the power efficiency and maximum output voltage of supply input circuit 26'. Of course, circuit 26' has the same disadvantages even if the DC power supply is hooked up in a reverse polarity. In that instance, diodes D2 and D3 are forward biased and diodes D1 and D4 are reverse biased, and nonconducting. Thus, the voltage drop introduced by circuit 26' in this arrangement is still two times $V_D$ (for diodes D2 and D3).

Figure 3:
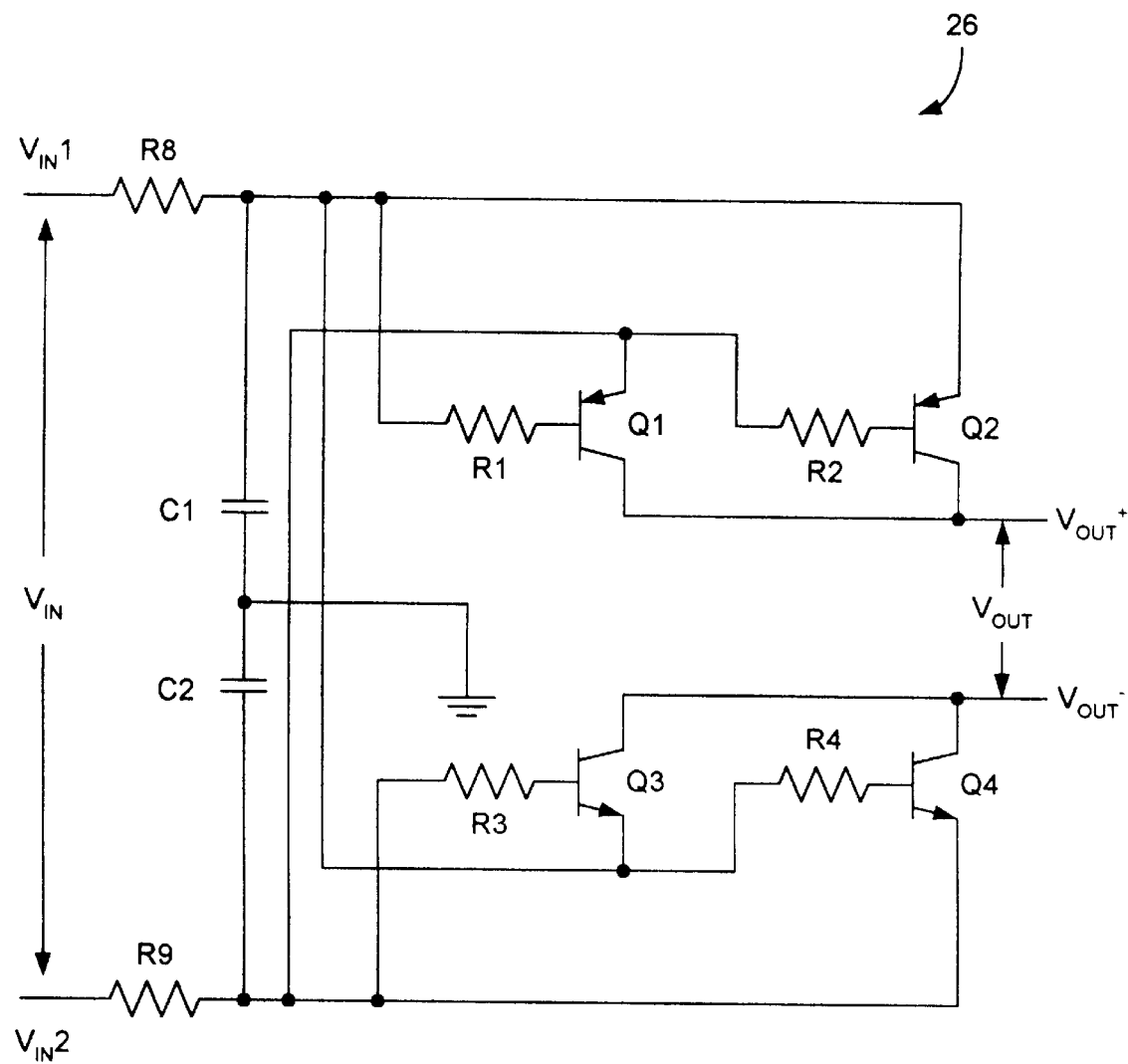
FIG. 3 shows one embodiment of an input circuit according to the present invention.

FIG. 3 illustrates one embodiment of supply input circuit 26 in accordance with the present invention. Supply input circuit 26 shown in FIG. 3 includes bipolar junction transistors Q1, Q2, Q3 and Q4, as well as bias resistors R1, R2, R3 and R4. FIG. 3 also includes input resistors R8 and R9 and capacitors C1 and C2 which can form part of capacitance isolation circuit 25. Capacitors C1 and C2 form an RF filter and resistors R8 and R9 are selected to have a value large enough to limit any potential energy storage in capacitors C1 and C2 from being rapidly discharged onto loop 16. This is described in greater detail in the above-referenced U.S. patent application Ser. No. 08/255,237.

FIG. 3 shows that bipolar transistors Q1–Q4 are configured as a bridge rectifier circuit. Transistors Q1 and Q2 are PNP transistors and transistors Q3 and Q4 are NPN transistors. In the embodiment shown in FIG. 3, the bias resistors R1–R4 are selected so that the conducting transistors operate in the saturated range. In other words, the bias resistors R1–R4 are chosen so that the PNP transistor with an emitter voltage that is positive with respect to $V_{OUT}+$ and the NPN transistor with an emitter voltage that is negative with respect to $V_{OUT}-$ generate a low collector to emitter saturation voltage. The other pair of transistors is biased so that neither of them are conducting.

In the embodiment shown in FIG. 3, it is assumed that the DC supply voltage is coupled to field instrument 10 so that $V_{IN1}$ has a higher voltage potential than $V_{IN2}$. In that case, transistors Q1 and Q3 are biased so that they do not conduct, while transistors Q2 and Q4 are biased so that they operate in the saturated range. Of course, if the DC supply voltage were coupled to field instrument 10 in a reverse polarity, transistors Q1 and Q3 would be biased to operate in the saturated range while transistors Q2 and Q4 would be biased off.

In either case, circuit 26 only introduces a voltage drop equal to the collector to emitter saturation voltage of the saturated transistors. Since a typical transistor saturation voltage is approximately 0.05 to 0.2 volts, circuit 26 introduces a voltage drop ($V_{IN}-V_{OUT}$) of only approximately 0.10 to 0.40 volts. This is significantly less than the voltage drop introduced by circuit 26' of the prior art, shown in FIG. 2.

Figure 4:
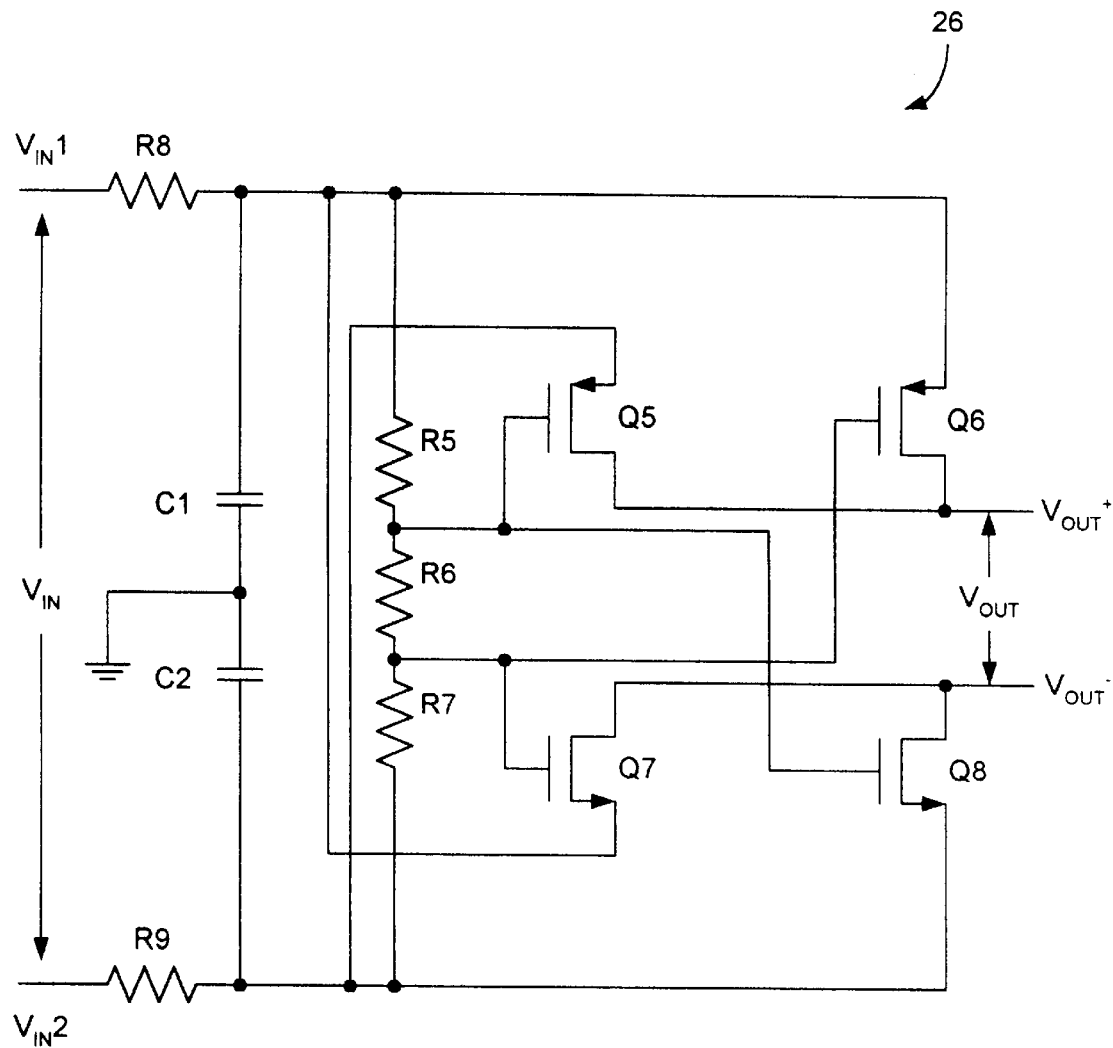
FIG. 4 shows a second embodiment of an input circuit according to the present invention.

FIG. 4 is a second embodiment of supply input circuit 26 according to the present invention. Supply input circuit 26 shown in FIG. 4 is similar to the circuit shown in FIG. 3 except that it is implemented using field effect transistors. The circuit includes field effect transistors Q5, Q6, Q7 and Q8 and bias resistors R5, R6 and R7. In the implementation shown in FIG. 4, PNP transistors Q1 and Q2 of FIG. 3 have been replaced by P-channel MOSFETS Q5 and Q6 and NPN transistors Q3 and Q4 of FIG. 3 have been replaced by N-channel MOSFETS Q7 and Q8. Again, assuming $V_{IN1}$ has a higher voltage potential than $V_{IN2}$, MOSFETS Q6 and Q8 provide the output voltage $V_{OUT}$, with a very small voltage drop ($V_{IN}-V_{OUT}$), while MOSFETS Q5 and Q7 are biased off. If the polarity of the DC supply is reversed, and $V_{IN2}$ has a higher voltage potential than $V_{IN1}$, then MOSFETS Q5 and Q7 provide the output voltage $V_{OUT}$ while MOSFETS Q6 and Q8 are biased off.

Of course, these circuit diagrams are illustrative only, and a variety of other configurations could be used as well. For example, in FIG. 4, resistor R6 could be open circuited and resistors R5 and R7 could be short circuited. Also, both transistor pairs Q5, Q7 and Q6, Q8 can be MOSFETS, or one pair can be bipolar junction transistors while the other pair can be MOSFETS.

Figure 5:
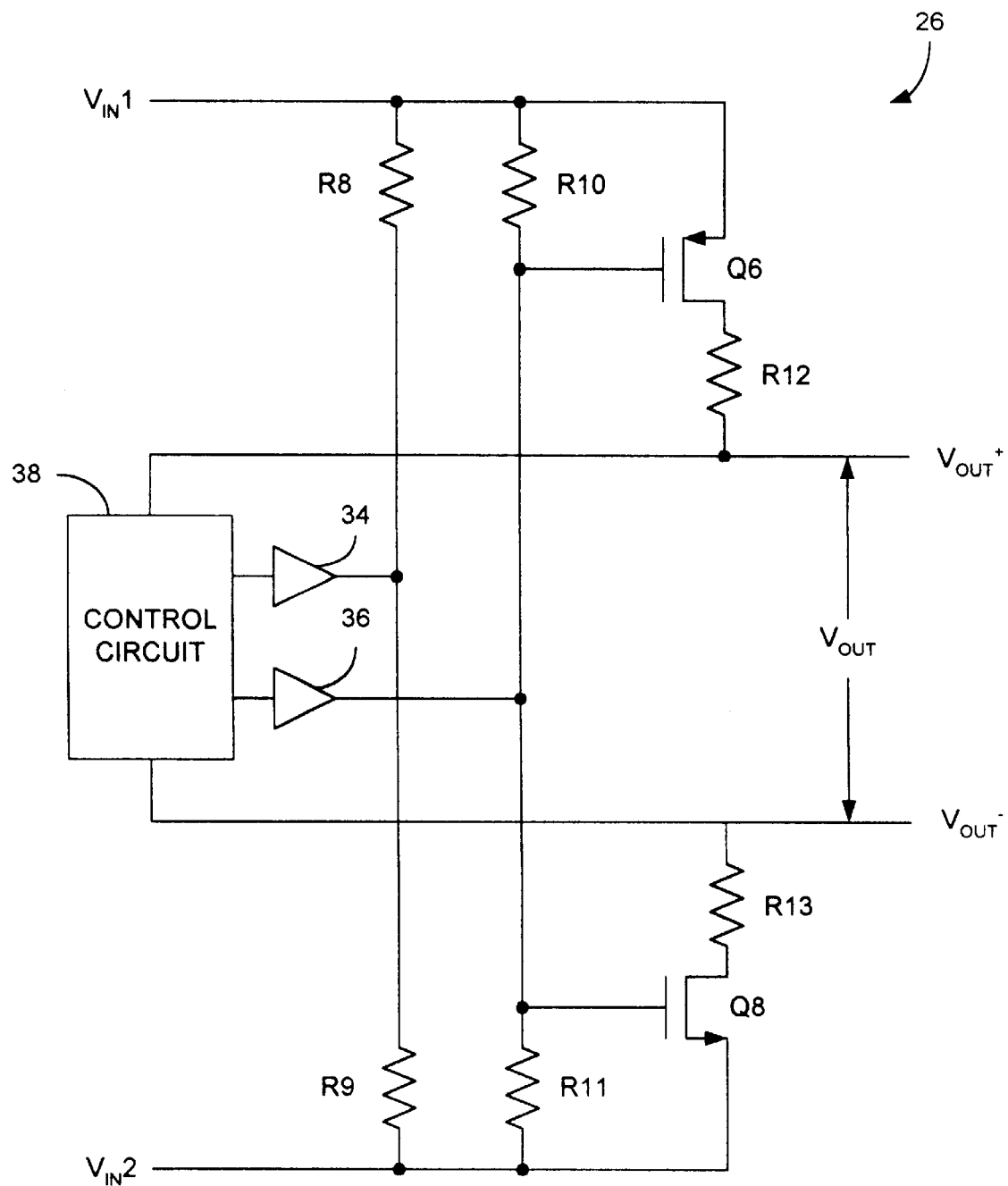
FIG. 5 shows a portion of an input circuit implementing a second embodiment of the present invention.

The present invention can also be implemented using an active biasing network. Such a network can be used to implement a control function in circuit 26. FIG. 5 illustrates a portion of one embodiment of input circuit 26 using such an active biasing network. FIG. 5 only shows one pair of transistors (e.g., Q6 and Q8), for the sake of simplicity. However, it will be appreciated that a similar network can also be implemented with the other set of transistors, such as transistors Q5 and Q7.

The embodiment of supply input circuit 26 shown in FIG. 5 includes, in addition to the transistors Q6 and Q8, resistors R8, R9, R10, R11, R12 and R13, amplifiers 34 and 36 and control circuit 38. While the embodiments of circuit 26 shown in FIGS. 3 and 4 were biased based substantially only on the values of the input voltage, the embodiment of circuit 26 shown in FIG. 5 is biased based on the values of the input voltage, but also based on another desired parameter through the operation of control circuit 38. The other desired parameter is dependent upon the purpose of control circuit 38.

For example, the control function implemented by circuit 38 can be any desired control function such as a current or voltage regulator function which controls transistors Q6 and Q8 based on the current or output voltage, or a fault detector function which detects faults (such as over-current, or over-temperature or other fault conditions) and controls the output transistors Q6 and Q8 based on the fault detected. In essence, since the supply input circuit 26 is no longer configured using only diodes, but is instead configured using a transistor bridge, the circuit can now be actively controlled as desired.

Resistors R8 and R9, and resistors R10 and R11, form voltage dividers which are coupled to MOSFETS Q6 and Q8. These voltage dividers are coupled between voltages $V_{IN1}$ and $V_{IN2}$.

Resistors R12 and R13 are typically implemented when the control function implemented by control circuit 38 is based (at least in part) on the output current. Such a control function includes a current regulator function and an over-current function. In that case, resistors R12 and R13 are very low value resistors in order to maintain a very low voltage drop across the circuit 26. Also, in that case, amplifiers 34 and 36 are preferably operational transconductance amplifiers which sink or source more current based on their inputs.

In the embodiment in which control circuit 38 controls the output of circuit 26 to accomplish a controlled output voltage, circuit 26 determines the bias point of resistors Q6 and Q8 based on the polarity of the input voltage, and also based on the output voltage and a reference voltage supplied to control circuit 38. The reference voltage is preferably any suitable value.

In the embodiment in which control circuit 38 controls the output of circuit 26 based on fault conditions, then the output of circuit 26 is controlled based on the polarity of the input voltage, as well as an output from a fault sensor, such as an over-current sensor, or an over temperature sensor.

Figure 6:
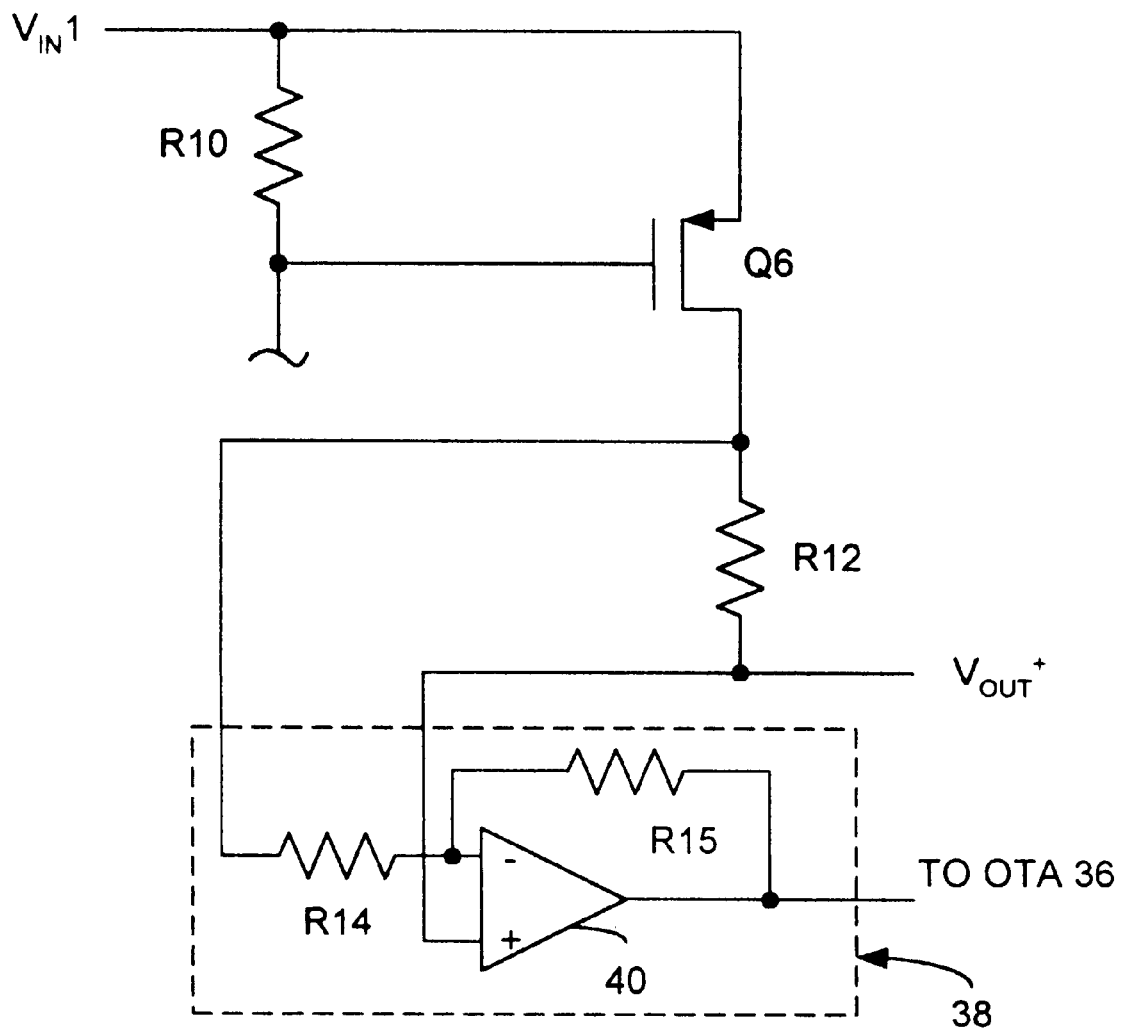
FIG. 6 shows a portion of the input circuit of FIG. 5 in greater detail.

FIG. 6 shows one embodiment of a portion of circuit 26 shown in FIG. 5 wherein control circuit 38 comprises a current regulator. The only portion of control circuit 38 which is shown in FIG. 6 is that which is associated with output transistor Q6. Of course, it will be appreciated that a similar configuration would be associated with each of the transistors Q5, Q6, Q7 and Q8 in circuit 26 in order to accomplish desired control.

In the embodiment shown in FIG. 6, control circuit 38 includes amplifier 40 and resistors R14 and R15. Amplifier 40 has its inverting input connected to its output through feedback resistor R15, and to one side of resistor R12 through resistor R14. Amplifier 40 has its non-inverting input coupled to $V_{OUT}+$. In this arrangement, amplifier 40 is configured to sense the current provided at the output $V_{OUT}+$ and provide an output indicative of that current. The output of amplifier 40 is provided as an input to a remainder of control circuit 38. Control circuit 38 provides the appropriate transfer function so that the output is suitable to be received by operational transconductance amplifier 34 based on the control function being implemented. Therefore, based on the sensed output current across resistor R12, control circuit 38 controls operational transconductance amplifier 34 to either source or sink additional current. This controls the output current through transistor Q6 and thus controls the output current at $V_{OUT}+$.

Depending on the particular configuration of amplifier 40, control circuit 38 can detect a fault condition, such as an over current condition, or can maintain the output current at $V_{OUT}+$ at a constant level. As with the other figures in the present application, FIG. 6 is illustrative only and a variety of other configurations can be used as control circuit 38 in order to control according to any number of different parameters.

Figure 7:
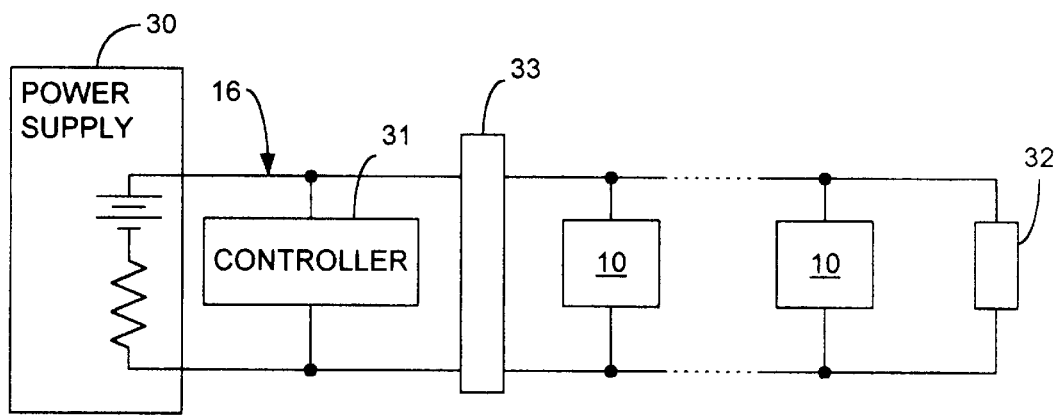
FIG. 7 shows an implementation of the present invention in a field bus multidrop configuration.

FIG. 7 illustrates the present invention implemented in a fieldbus multidrop configuration. Power supply 30 provides power to the system over loop 16. Controller 31 provides communication over loop 16 with a plurality of field instruments 10. Loop 16 is terminated by a fieldbus terminator 32, and barrier 33 provides an intrinsic safety barrier between a hazardous environment and safe environment. It should be noted that field instruments 10 may be located in either the hazardous or the safe environment.

Therefore, the present invention provides a power supply input circuit to a field instrument which has a significantly reduced voltage drop thereacross. At the same time, the input circuit according to the present invention is symmetrical to accommodate AC input current, and to allow a DC voltage supply to be coupled to the field instrument in either polarity. Because the present input circuit introduces such a small voltage drop, the present circuit provides greatly improved power efficiency and a higher maximum output voltage at either a comparable or lower cost than prior input circuits.

Also, the supply input circuit according to the present invention, since it is implemented as a transistor bridge instead of a diode bridge, can be controlled. Thus, the biasing circuit can be formed as an active biasing circuit which controls the output of circuit 26 to regulate output voltage, to regulate output current, or based on any number of other conditions which are sensed by the control circuit 38.

Although the present invention has been described with reference to preferred embodiments, workers skilled in the art will recognize that changes may be made in form and detail without departing from the spirit and scope of the invention.

What is claimed is:

1. A field instrument in a process control system, the field instrument comprising:
    communication loop input terminals coupleable to a communication loop for receiving a power signal having a first polarity or a second polarity, opposite the first polarity;
    a peripheral device;
    a peripheral device accessing circuit, coupled to the peripheral device; and
    a supply input circuit coupled between the peripheral device accessing circuit and the communication loop input terminals, including a transistor bridge rectifier configured to receive power solely through the communication loop input terminals from the power signal and comprising a first set of transistors which provide power to the peripheral device accessing circuit when the power signal is of the first polarity and a bias circuit biasing the first set of transistors to be in a saturated state when the power signal is of the first polarity.

2. The field instrument of claim 1 and further comprising a 4–20 mA two wire communication loop coupled to the communication loop input terminals.

3. The field instrument of claim 1 wherein the transistor bridge rectifier comprises:
    a second set of transistors providing the power to the peripheral device accessing circuit when the power signal is of the second polarity; and
    a bias circuit biasing the second set of transistors to be in a saturated state when the power signal is of the second polarity.

4. The field instrument of claim 3 wherein at least one of the first and second sets of transistors comprises bipolar junction transistors.

5. The field instrument of claim 3 wherein at least one of the first and second sets of transistors comprises metal oxide semiconductor field effect transistors.

6. The field instrument of claim 1 wherein the transistor bridge rectifier is configured to receive the power signal from the communication loop as a DC voltage to power the peripheral device accessing circuit and to provide an output voltage having a predetermined polarity regardless of whether the communication loop is coupled to the communication loop input terminals in the first polarity or in the second polarity.

7. The field instrument of claim 1 wherein the transistor bridge rectifier is configured to receive the power signal from the communication loop as an AC current which alternates between the first and second polarities to power the peripheral device accessing circuit and to provide an output current having a predetermined polarity regardless of whether the communication loop is coupled to the communication loop input terminals in the first polarity or in the second polarity.

8. A field instrument, comprising:
    a peripheral device;
    a peripheral accessing circuit; and
    an input circuit, coupled to the peripheral accessing circuit and being powered by a communication loop, the input circuit receiving power from the communication loop and providing power to the peripheral accessing circuit and having a voltage drop thereacross of within approximately 0.4 volts or less.

9. The field instrument of claim 8 wherein the input circuit comprises:
    a transistor bridge rectifier configured to receive power from the communication loop and provide power to the peripheral accessing circuit.

10. The field instrument of claim 8 wherein the power from the communication loop is provided as a power signal having one of a first polarity and a second polarity, opposite the first polarity, and wherein the transistor bridge rectifier comprises:
    a first set of transistors providing the power to the peripheral accessing circuit when the power signal is of the first polarity; and
    a bias circuit biasing the first set of transistors to be in a saturated state when the power signal is of the first polarity.

11. The field instrument of claim 10 wherein the transistor bridge rectifier comprises:

a second set of transistors providing the power to the peripheral accessing circuit when the power signal is of the second polarity; and a bias circuit biasing the second set of transistors to be in a saturated state when the power signal is of the second polarity.

12. The field instrument of claim 8 wherein the peripheral device comprises a sensor sensing a process variable, and wherein the peripheral accessing circuit comprises a two wire transmitter.

13. The field instrument of claim 8 wherein the peripheral device comprises a controllable device for controlling a process parameter and wherein the peripheral accessing circuit comprises a process variable control circuit coupled to the controllable device.

14. A transmitter in a process control system, the transmitter comprising:

communication loop input terminals coupleable to a communication loop for receiving a power signal having a first polarity or a second polarity, opposite the first polarity;

a sensor sensing a process variable and providing a sensor signal indicative of the process variable;

a transmitter circuit, coupled to the sensor, receiving the sensor signal and providing an output signal through the communication loop input terminals indicative of the sensor signal; and the transmitter circuit including:

a transistor bridge rectifier coupled to the communication loop input terminals and being configured to receive power solely through the communication loop from the power signal, the transistor bridge rectifier including a pair of transistors which provide sole power to a remainder of the transmitter circuit when the power signal is of the first polarity and including a bias circuit biasing the pair of transistors in a saturated state based on at least an input voltage to the transistor bridge rectifier.

15. A process control system, comprising:

communication loop input terminals coupleable to a communication loop for receiving a power signal having a first polarity or a second polarity, opposite the first polarity;

a controllable device controlling a process parameter;

a control circuit, coupled to the controllable device, providing an output signal to control the controllable device and providing a communication signal through the communication loop input terminals, the control circuit including:

a transistor bridge rectifier circuit configured to receive power solely through the communication loop input terminals from the power signal, the transistor bridge rectifier including a pair of transistors which provide sole power to a remainder of the control circuit when the power signal is of the first polarity and including a bias circuit biasing the pair of transistors in a saturated state based on at least an input voltage to the transistor bridge rectifier.

16. A field instrument in a process control system, the field instrument comprising:

communication loop input terminals coupleable to a communication loop for receiving a power signal having a first polarity or a second polarity, opposite the first polarity;

a processing circuit receiving an input, performing a calculation based on the input, and providing an output based on the calculation; and a supply input circuit coupled to the processing circuit and the communication loop input terminals, the supply input circuit including a transistor bridge rectifier configured to receive power solely through the communication loop input terminals from the power signal and comprising a first set of transistors which provide sole power to the processing circuit when the power signal is of the first polarity and a bias circuit biasing the first set of transistors in a saturated state when the power signal is of the first polarity.

17. The field instrument of claim 16 and further comprising:

a peripheral device, wherein the processing circuit includes a peripheral device accessing circuit coupled to the peripheral device.

18. The field instrument of claim 16 wherein the bias circuit comprises an active bias circuit for controlling the first set of transistors.

19. A field instrument in a process control system, the field instrument comprising:

communication loop input terminals coupleable to a communication loop;

a sensor for sensing a process variable;

a two wire transmitter coupled to the sensor; and a supply input circuit coupled between the two wire transmitter and the communication loop input terminals, including a transistor bridge rectifier configured to receive power solely through the communication loop input terminals and provide power to the two wire transmitter.

20. A field instrument in a process control system, the field instrument comprising:

communication loop input terminals coupleable to a communication loop;

a controllable device for controlling a process parameter;

a process variable control circuit coupled to the controllable device; and a supply input circuit coupled between the process variable control circuit and the communication loop input terminals, including a transistor bridge rectifier configured to receive power solely through the communication loop input terminals and provide power to the process variable control circuit.

21. A field instrument in a process control system, the field instrument comprising:

communication loop input terminals coupleable to a communication loop;

a peripheral device;

a peripheral device accessing circuit, coupled to the peripheral device;

a supply input circuit coupled between the peripheral device accessing circuit and the communication loop input terminals, including a transistor bridge rectifier configured to receive power solely through the communication loop input terminals and provide power to the peripheral device accessing circuit; and an active bias circuit, coupled to the transistor bridge rectifier, biasing the transistor bridge rectifier based on a desired input parameter.

22. The field instrument of claim 21 wherein the active bias circuit includes:

an output current sensor, sensing output current, the active bias circuit and biasing the transistor bridge rectifier based on the output current.

23. The field instrument of claim 21 wherein the active bias circuit includes:

an output voltage sensor, sensing output voltage, the active bias circuit biasing the transistor bridge rectifier based on the sensed output voltage.

24. The field instrument of claim 21 wherein the active bias circuit includes:

a fault detector detecting a fault, the active bias circuit biasing the transistor bridge rectifier based on the fault detected.

25. The field instrument of claim 24 wherein the fault detector comprises:

an over current detector.

* * * * *